Jan. 18, 1927.

E. W. ALBURTIS 1,614,450

ANIMAL TRAP

Filed March 16, 1926   2 Sheets-Sheet 1

Inventor
E. W. Alburtis
By Clarence A. O'Brien
Attorney

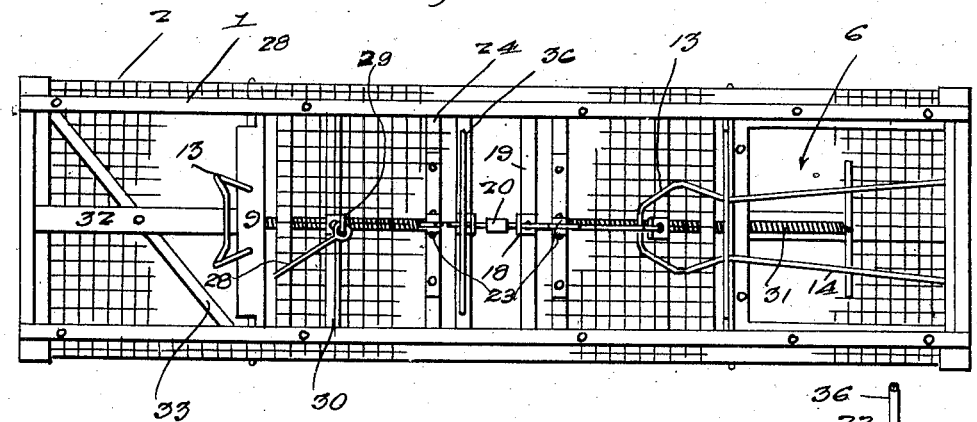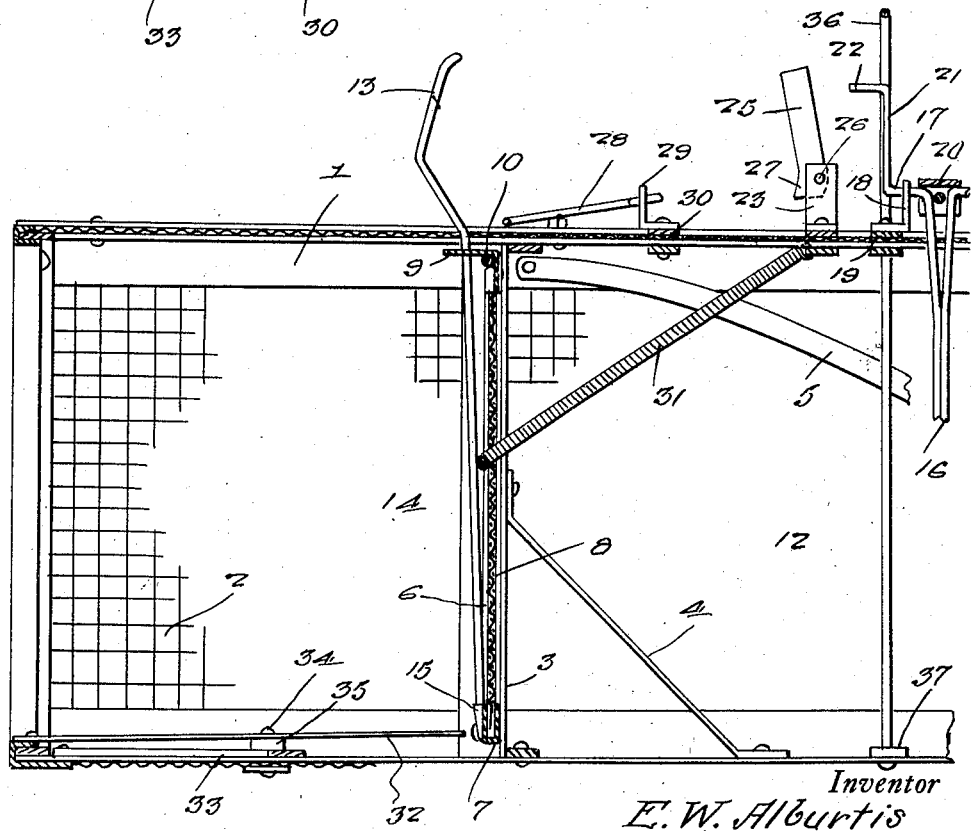

Patented Jan. 18, 1927.

1,614,450

UNITED STATES PATENT OFFICE.

EDWARD W. ALBURTIS, OF ELDORADO SPRINGS, MISSOURI.

ANIMAL TRAP.

Application filed March 16, 1926. Serial No. 95,108.

The present invention relates to improvements in animal traps and has for its principal object to provide a trap which will imprison the animal when the animal enters the trap, thus preventing the skin of the animal being damaged, such as ordinarily results when animals are caught by an impaling trap.

A further object is to provide an animal trap of the above mentioned character which will at all times be positive and efficient in its operation, the animal being adapted to automatically actuate the swinging closure for imprisoning the animal in the trap when the bait is attempted to be removed from the bait holding trigger.

A further object is to provide an animal trap of the above mentioned character which is simple in construction, strong, and durable, and further well adapted to the purpose for which it is designed.

Other objects and advantages of the invention will become apparent during the course of the following description taken in connection with the accompanying drawing.

In the accompanying drawing forming part of this application, and in which like numerals designate like parts throughout the several views:

Figure 2 is a top plan view thereof.

Figure 3 is an enlarged longitudinal sectional view showing the position of the parts when the swinging closure has been tripped.

Figure 1:
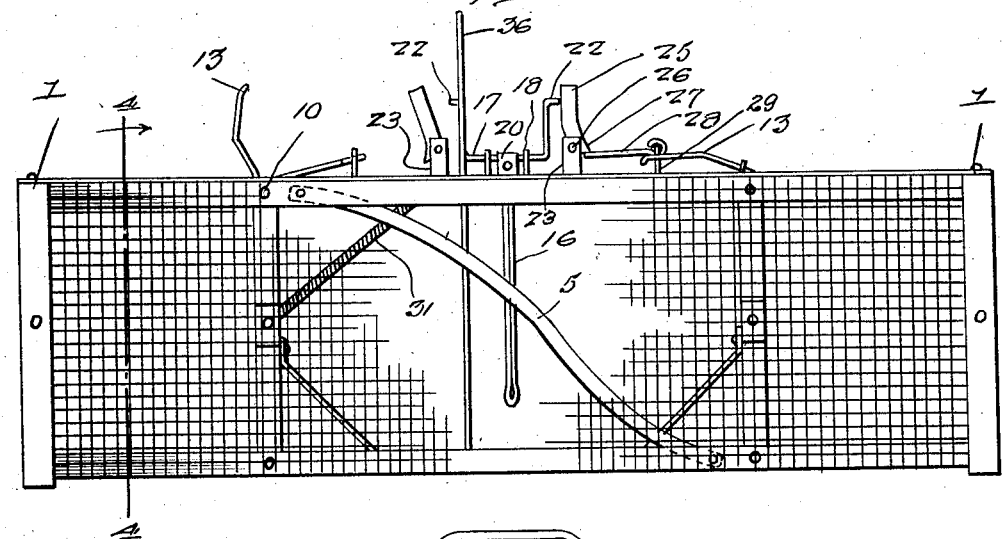
Figure 1 is a side elevation of my improved trap, one of the swinging closures being shown in its normal open position, whereby the trap is set ready for use.

In the drawings wherein for the purpose of illustration is shown the preferred embodiment of my invention, my improved animal trap comprises the substantially rectangular shaped frame designated generally by the numeral, the same being formed of angle iron material. Suitable wire mesh screening 2 extends over the sides, top, and bottom respectively of the frame, whereby the ends of the trap are left open. As is more clearly illustrated in Figures 2 and 4 of the drawings, the portion of the wire mesh which extends across the top of the frame is cut away adjacent the respective ends of the frame. A pair of angle iron stop members 3 are arranged on the inner sides of the frame adjacent the respective ends thereof, and the purpose thereof will be hereinafter more fully described. Suitable braces 4 are provided for the angle iron stop members and additional bracing means 5 is associated with the intermediate portion of the frame.

Swinging closures designated generally by the numeral 6 are provided for the respective open ends of the trap, and each of these swinging closures includes a substantially rectangular frame 7 in which is secured the piece of wire mesh screening 8. A laterally disposed flange 9 is formed at the top of the frame 7 of each of the swinging closures in the manner shown at 9 in Figure 3 of the drawings.

Figure 4:
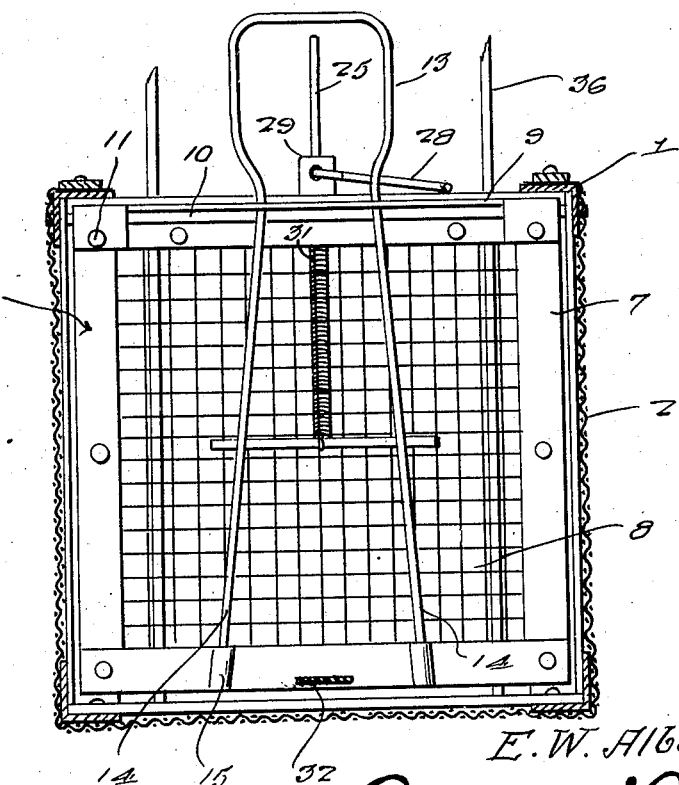
Figure 4 is a sectional view taken approximately on line 4—4 of Figure 1, looking in the direction of the arrows.

A pivot rod 10 extends transversely through suitable bearings 11 provided therefor at the top of each of the frames 7, the ends of the rod 10 being journaled in the respective sides of the frame in the manner as clearly illustrated in Figures 3 and 4, whereby the swinging closures 6 will be adapted to swing upwardly and outwardly, the stop members 3 limiting the inward swinging movement of the closures. The swinging closures cooperate with the stop members to provide an intermediate imprisoning compartment or chamber 12.

Associated with each of the swinging closures 6 is a bail member, the same being formed of a single strand of wire which is looped intermediate its ends, as at 13. The spaced arms 14 of this bail member extends downwardly through the lateral flange 9 formed at the top of each of the frames of the swinging closures, and the lower ends of these arms are secured in suitable pockets 15 provided therefor in the bottom portion of the frame for each of the swinging closures in the manner as is more clearly illustrated in Figures 3 and 4. The looped portion 13 of each of the bail members is disposed substantially vertically above the respective swinging closures as well as above the top of the frame, and the purpose of this arrangement will also be hereinafter more fully described.

Extending downwardly through the top of the trap into the central portion of the imprisoning chamber or compartment 12 is the bait holding trigger 16. This trigger is preferably formed of a single strand of wire which is bent back upon itself intermediate its ends, to provide a pair of arms which are arranged in abutting relation for their greater length as is more clearly shown in Figure 1.

The free ends of the arms which extend upwardly through the wire mesh covering the top of the frame are disposed laterally in opposite directions as at 17, these laterally disposed portions 17 being journaled through the vertical portions of the angular brackets 18 which are secured on the intermediate portions of the spaced cross strips 19 whereby the trigger 16 is adapted for swinging movement. A clip or the like such as is shown at 20 secures the portions of the arms forming the trigger 16 at the point where the same diverge to form the laterally extending portions 17.

The laterally disposed portions 17 of the arms terminate in the upstanding portion 21, and the upper free ends of the arms are disposed laterally or outwardly to provide the trip lever engaging fingers 22.

A pair of brackets such as are shown at 23 are secured on the transversely extending strips 24 which are disposed on opposite sides of the trigger 16 and pivotally supported on each of these brackets at a point adjacent the lower end thereof is the trip lever 25, the pivotal connection therefor being illustrated at 26. A foot 27 is formed on the lower end of each of the trip levers, and the purpose thereof will also be hereinafter more fully described. The inner side edges of the trip levers 25 are adapted to coact with the respective fingers 22 which are formed on the upper free ends of the arms comprising the bait holding trigger. This will also be readily apparent from the following description.

Coacting with the looped portion of each of the bails associated with the respective swinging closures 6 is the swinging arm 28. The inner end of each arm is pivotally secured to an angular bracket 29 which extends upwardly from the transverse strip 30 which is disposed on opposite sides of the trigger, and is preferably located between the angular stop 3, and the respective trip levers 25. The manner in which the swinging arms cooperate with the looped portions 13 is more clearly shown in Figures 1 and 2 of the drawings, wherein it will be readily seen that the arm 28 extends through and over the crown portion of the looped portion of one of the bails and when the free end of the arm is disposed beneath the foot 27 of the adjacent trip lever 25, the swinging closure will be held in a horizontal raised position so that the adjacent end of the trap will be opened. It will of course be understood that the other swinging closure is disposed in a closed position, thus leaving the compartment 12 open only at one end.

A coil spring 31 is associated with each of the swinging closures and extends between the intermediate portion of each closure and the top wire mesh covering which extends over the imprisoning compartment 12 in the manner as more clearly shown in Figure 3. The coil springs normally retain the swinging closures in their closed positions, and in engagement with the respective stop members 3, and when one of the swinging closures is swung upwardly and held in a horizontal position adjacent the top of the frame, the coil spring will be placed under tension.

When the parts of the trap are arranged as shown in Figure 1 of the drawings, the trap is set, and upon the animal entering the compartment 12, when an attempt is made to remove the bait from the lower portion of the trigger 16, the trigger will be adapted to swing inwardly, moving the finger which is in engagement with the upper side edge of the trip lever 25 out of engagement therewith whereby said lever will swing on its pivot 26 so that the foot 27 will become disengaged from the free end of the swinging arm 28, and then the coil spring 31 which has been placed under tension will automatically effect the downward swinging movement of the closure into engagement with the respective stop members so that the open end of the chamber will be closed, and the animal will thus be imprisoned therein.

For the purpose of preventing the animal escaping from the chamber by either end thereof, there is provided in the bottom of the frame at each end thereof the spring tongue 32. The outer end of each of the aforementioned spring tongues is secured to the outermost end of the frame at its bottom, and the intermediate portion of each spring tongue is further secured to the diagonally extending braces 33 at their points of intersection therewith in the manner as indicated at 34. A spacing member 35 is disposed between each of the spring tongues 32 and the respective braces 33 so that the inner free end of each spring tongue will be spaced above the bottom of the frame, and will terminate in close proximity to the bottom of the respective swinging closures.

By arranging the spring tongue 32 in the manner as shown more clearly in Figure 3, which has been heretofore more fully described, it will be readily obvious that should the animal attempt to push the swinging closure outwardly in an endeavor to escape from the imprisoning chamber of the trap, the bottom portion of the frame of each of the swinging closures will strike the innermost end of the adjacent spring tongue, thus limiting and preventing the further upward swinging movement of the closure. The free ends of the spring tongues however will permit the swinging closures to be swung downwardly into their closed positions so as to engage the stop members.

A trap of the above mentioned character enables either end of the imprisoning compartment to be held in an open and set position. To facilitate the carrying of the trap, a handle such as is shown at 36 is associated with the trap, the same being formed of a single strand of wire of substantially U-shaped configuration, the arms thereof extending downwardly into the central compartment 12 and being secured at their lower free ends to a strip 37 which extends transversely across the bottom of the frame. The crown or bail portion of the handle is disposed above the top of the trap so as not to interfere with the swinging closure actuating mechanism.

It will thus be seen from the foregoing description, that an animal trap has been provided which will at all times be positive and efficient in carrying out the purposes for which it is designed, and by further providing a trap wherein the animal is imprisoned, the skins of the animals captured will not be injured such as would be the case where an impaling trap was employed.

While I have shown the preferred embodiment of my invention it is to be understood that minor changes may be made in the size, shape, and arrangement of parts without departing from the spirit of the invention and the scope of the appended claims.

Having thus described the invention, what I claim as new and desire to secure by Letters Patent is:—

1. A trap of the class described comprising in combination, a wire mesh covered frame open at its respective ends, a swinging closure at each end and pivoted at its upper end, a looped member extending upwardly from each closure, a bait holding trigger extending downwardly into the trap, and adapted for swinging movement, a pivoted trip lever supported at the top of the trap adjacent the upper end of the trigger, and normally in engagement therewith, a foot formed on the lower end of the lever, a swinging arm on the top of the trap adapted to extend over the looped member, and hold the same and the closure in its upwardly swung position, the free end of the arm normally engaging said foot whereby the trap is set, and a coil spring for automatically returning the swinging closure to its normally closed position for imprisoning the animal in the trap when the trigger is actuated by the animal, and thus effecting the release of the lever and said arm.

2. A trap of the class described comprising in combination, a wire mesh covered frame open at its respective ends, a swinging closure at each end and pivoted at its upper end, a looped member extending upwardly from each closure, a bait holding trigger extending downwardly into the trap, and adapted for swinging movement, a pivoted trip lever supported at the top of the trap adjacent the upper end of the trigger, and normally in engagement therewith, a foot formed on the lower end of the lever, a swinging arm on the top of the trap adapted to extend over the looped member, and hold the same and the closure in its upwardly swung position, the free end of the arm normally engaging said foot whereby the trap is set, and a coil spring for automatically returning the swinging closure to its normally closed position for imprisoning the animal in the trap when the trigger is actuated by the animal, thus effecting the release of the lever and the arm, means for preventing the upward swinging movement of the closure, said last mentioned means comprising a spring tongue secured in the bottom of the trap, the inner free end thereof being disposed in close proximity to the bottom of the swinging closure.

3. An animal trap of the class described comprising a wire mesh covered frame, the ends of the trap being open, a pair of swinging closures for the respective ends of the trap, the same being pivotally supported at their upper ends between the sides of the frame inwardly of the respective ends of the trap, to provide a central imprisoning compartment, a bait carrying trigger extending downwardly into the compartment, the upper end of said trigger being disposed above the top of said compartment and being further adapted for swinging movement, a pair of trip levers pivotally supported on opposite sides of the upper end of the trigger, a pair of swingable arms supported on the top of the compartment on opposite sides of the upper end of the trigger, an arm engaging foot associated with each of the aforementioned levers, means associated with each of said swinging closures and adapted to be engaged by the respective swingable arms for holding either of the closures in a horizontal open position when the free end of the swingable arm is engaged by said foot and said lever is in engagement with the upper end of the trigger, and means for automatically returning the horizontally disposed closure to its normally closed position when said trigger is actuated, and the foot associated therewith is automatically released from engagement with the upper end of the trigger, and the free end of the swingable arm respectively.

4. An animal trap of the class described comprising a wire mesh covered frame, the ends of the trap being open, swinging closures for the respective ends of the trap, the same being pivotally supported at their upper ends between the sides of the frame inwardly of the respective ends of the trap, to provide a central imprisoning compartment, a bait carrying trigger extending downwardly into the compartment, the upper end of said trigger being disposed above the top of said compartment and being further adapted for swinging movement, a pair of trip levers pivotally supported on opposite sides of the upper end of the trigger, a pair of swingable arms supported on the top of the compartment on opposite sides of the upper end of the trigger, an arm engaging foot associated with each of the aforementioned levers, means associated with each of the swinging closures and adapted to be engaged by the respective swingable arms for holding either of the closures in a horizontal open position when the free end of the swingable arm is engaged by said foot and said lever is in engagement with the upper end of the trigger, means for automatically returning the horizontally disposed closure to its normally closed position when said trigger is actuated, and the foot associated therewith is automatically released from engagement with the upper end of the trigger, and the free end of the swingable arm respectively, and a spring tongue secured in the bottom of the trap at each end thereof, the inner free end of each tongue cooperating with the lower portions of the respective swingable closures to limit the outward and upward swinging movement of said closures.

In testimony whereof I affix my signature.

EDWARD W. ALBURTIS.